R. E. RILEY.
MANUFACTURE OF RUBBER BATHING CAPS.
APPLICATION FILED AUG. 9, 1920.

1,388,762. Patented Aug. 23, 1921.

Inventor:
Ralph E. Riley,
by Offean Middleton Donaldson & Hall
Attys.

UNITED STATES PATENT OFFICE.

RALPH E. RILEY, OF AKRON, OHIO, ASSIGNOR TO THE MILLER RUBBER COMPANY, A CORPORATION OF OHIO.

MANUFACTURE OF RUBBER BATHING-CAPS.

1,388,762.   Specification of Letters Patent.   Patented Aug. 23, 1921.

Original application filed September 11, 1919, Serial No. 323,096. Divided and this application filed August 9, 1920. Serial No. 402,220.

*To all whom it may concern:*

Be it known that I, RALPH E. RILEY, a citizen of the United States, and a resident of Akron, in the county of Summit and State of Ohio, have invented certain new and useful Improvements in the Manufacture of Rubber Bathing-Caps, of which the following is a specification, this application being a division of Serial No. 323,096, filed September 11th, 1919.

My invention relates to improvements in the manufacture of rubber bathing caps and aims to provide a process by which such articles may be made in a much more expeditious and economical manner than heretofore and also to provide improved means for carrying out the process.

The invention includes the novel process hereinafter described and particularly defined by the appended claims.

In order that my invention may be better understood I have appended hereto drawings, in which.

The particular form of cap to which the present invention relates is what is known as the "sailor type."

Figure 1:
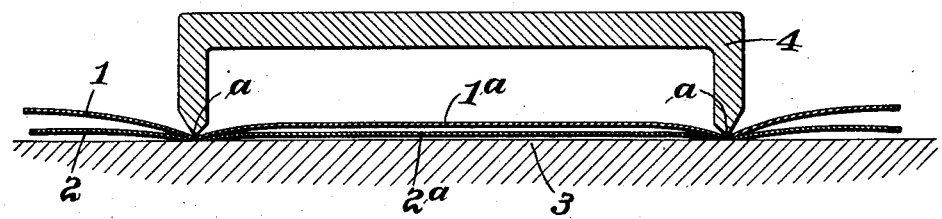
Figure 1 is a view of a sectional diagrammatic nature showing two superimposed rubber sheets upon a platen with a cutting die in the position assumed after severing and uniting the edges of the blanks which form the body of the cap.
Figure 2:
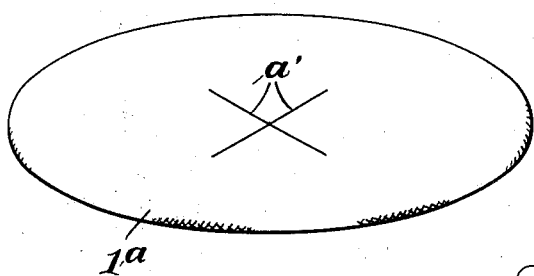
Fig. 2 is a perspective view showing the form of cut which is made in the upper blank.
Figure 3:
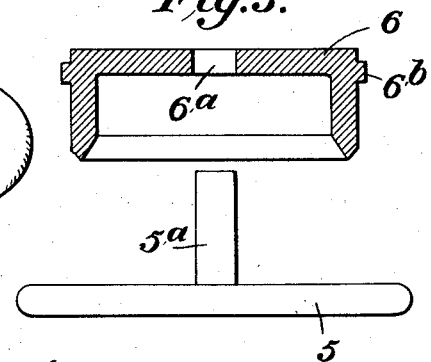
Fig. 3 is a view of a form of die and platen which I may conveniently use in applying the head-band to the cap body.
Figure 4:
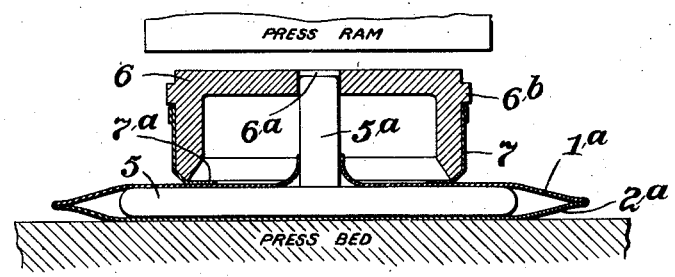
Fig. 4 is a sectional view illustrating the manner in which the die and platen of Fig. 3 is used.
Figure 5:
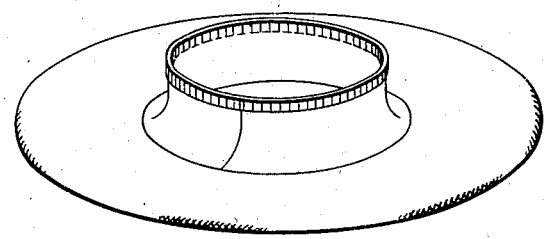
Fig. 5 is a view of the completed cap.

In proceeding according to my invention I place two superimposed sheets of unvulcanized rubber cap material, as indicated at 1 and 2, upon a suitable platen 3 and subject such sheets to the action of a combined cutting and pressing die 4, which has a blunt cutting edge of the shape clearly shown in Fig. 1. The pressure upon the die, which may be secured in any suitable manner, as by a press ram, severs from the sheets two substantially circular blanks, indicated at $1^a$ and $2^a$, on the drawings, and unites these together at their edges, the point of junction being indicated at $a$. The upper sheet $1^a$ is then, after removal from between the die and platen, cut by any suitable means such as for example a pair of scissors, to provide a slit or opening in the center preferably of cross or X-shape, as indicated at $a'$, Fig. 2. A flat platen 5 of hard steel or other suitable material and of circular or disk shape is inserted through slit $a'$ so as to lie between the sheets $1^a$ and $2^a$. This platen has a central vertically extending dowel or guide pin $5^a$ which is designed to coöperate with the central opening $6^a$ of a hard steel cutting and joining die 6, which has an edge similar to the edge of the die 4 except that the long bevel is reversely placed. This cutting die is of substantial cylindrical shape and has at the proper distance from the cutting edge an annular rib or flange $6^b$. An endless band 7 of rubber material which is designed to form the head-band of the cap is stretched over the outer surface of the die 6, its upper edge being brought into juxtaposition with the flange $6^b$ which determines the width of the band, the lower edge of the band by reason of the stretching action projecting inwardly over the cutting edge of the die as indicated at $7^a$. Pressure is now applied to the die to force the same down upon the platen with the result that the inwardly projecting portions $7^a$ and also corresponding inwardly projecting portions of the blank $1^a$ of the cap are severed along the circular line of the cutter and simultaneously joined together. The cap is now ready to be vulcanized in the usual manner.

It will be understood that the parts of the rubber sheets which are not designed to be thus joined together are dusted with a material such as powdered starch to prevent sticking.

The dies or platens or both may be heated in any suitable manner, if desired, to facilitate the operation.

The seam between the band 7 and the sheet $1^a$ is inturned or faces inwardly and this leaves the exterior free from any projecting rib.

Having thus described my invention, what I claim is:

1. The hereindescribed method of making rubber bathing caps which comprises superposing two imperforate sheets of unvulcanized rubber material, simultaneously cutting the superposed sheets along a circular line and joining the circular cut edges by a single operation, forming an opening approximately in the center of one of said sheets, and uniting a substantially cylindrical head band to the exterior surface of said sheet around said opening.

2. The hereindescribed method of making rubber bathing caps which comprises superposing two imperforate sheets of unvulcanized rubber material, simultaneously cutting the superposed sheets along a circular line and joining the circular cut edges by a single operation, forming an opening approximately in the center of one of said sheets, applying to the outer surface of said last named sheet around the opening the inwardly turned edge of a substantially cylindrical band or sleeve of rubber material, and simultaneously joining said circular band to said sheet and severing the free edges of both.

3. The hereindescribed method of making rubber bathing caps which comprises superposing two imperforate sheets of unvulcanized rubber material, simultaneously cutting the superposed sheets along a circular line and joining the circular cut edges by a single operation, forming an opening approximately in the center of one of said sheets, supporting said last named sheet from its inner surface, applying to said sheet around the opening the angularly turned edge of a substantially cylindrical band of rubber material, and pressing said angularly turned edge against the sheet to simultaneously join said band to the perforated sheet and sever the material projecting beyond the line of juncture.

4. The hereindescribed method of making rubber bathing caps which comprises superposing two imperforate sheets of unvulcanized rubber material, simultaneously cutting the superposed sheets along a circular line and joining the circular cut edges by a single operation, slitting one of said sheets approximately centrally thereof, supporting said last named sheet from its inner surface while spaced from the other sheet, applying to said slitted sheet around the opening the angularly turned edge of a substantially cylindrical band of rubber material, and pressing said angularly turned edge against the sheet to simultaneously join said band to the perforated sheet and sever the material projecting beyond the line of juncture.

In testimony whereof I affix my signature.

RALPH E. RILEY.